US008419064B2

(12) United States Patent
Erhardt

(10) Patent No.: US 8,419,064 B2
(45) Date of Patent: Apr. 16, 2013

(54) APPARATUS FOR ADDING WEIGHT TO A WORK VEHICLE

(75) Inventor: Edward N Erhardt, Poland, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 323 days.

(21) Appl. No.: 12/769,009

(22) Filed: Apr. 28, 2010

(65) Prior Publication Data
US 2011/0266783 A1 Nov. 3, 2011

(51) Int. Cl.
B60S 9/00 (2006.01)
(52) U.S. Cl.
USPC ........... 280/759; 280/425; 224/519; 224/521; 414/462
(58) Field of Classification Search .................. 280/758, 280/759, 416.2, 425; 224/519, 521; 414/462
See application file for complete search history.

(56) References Cited

U.S. PATENT DOCUMENTS

| 3,490,787 | A | | 1/1970 | Latterman et al. | |
|---|---|---|---|---|---|
| 3,614,135 | A | | 10/1971 | Eid | |
| 3,700,256 | A | | 10/1972 | Jones, Jr. | |
| 3,730,545 | A | | 5/1973 | Allori | |
| 3,888,507 | A | | 6/1975 | Berghausen | |
| 4,094,534 | A | | 6/1978 | Welke et al. | |
| 4,377,300 | A | | 3/1983 | Old | |
| 4,537,423 | A | | 8/1985 | Nau et al. | |
| 4,580,811 | A | | 4/1986 | Wykhuis et al. | |
| 4,651,902 | A | * | 3/1987 | Hobbs et al. | 222/153.09 |
| 4,664,404 | A | | 5/1987 | Schultz | |
| 5,029,740 | A | * | 7/1991 | Cox | 224/484 |
| 5,120,113 | A | | 6/1992 | Oyama et al. | |
| 5,219,180 | A | | 6/1993 | Zipser et al. | |
| 5,392,538 | A | * | 2/1995 | Geerligs et al. | 37/268 |
| 5,462,309 | A | | 10/1995 | Jeffers et al. | |
| 5,542,477 | A | * | 8/1996 | DeFrancq | 172/439 |
| 5,690,359 | A | | 11/1997 | Teich | |
| 6,164,896 | A | * | 12/2000 | Cummins | 414/462 |
| 6,209,898 | B1 | | 4/2001 | Fortier et al. | |
| 6,227,304 | B1 | * | 5/2001 | Schlegel | 172/439 |
| 6,296,436 | B1 | | 10/2001 | Ramun | |
| 6,533,319 | B1 | | 3/2003 | Denby et al. | |
| 7,152,883 | B2 | | 12/2006 | Niemela | |
| D549,740 | S | | 8/2007 | Teich | |
| 7,467,722 | B2 | | 12/2008 | Ramun | |
| 7,618,062 | B2 | * | 11/2009 | Hamm et al. | 280/759 |
| 7,686,097 | B2 | | 3/2010 | Mozingo et al. | |
| 7,828,071 | B2 | * | 11/2010 | Breneur et al. | 172/439 |

FOREIGN PATENT DOCUMENTS

| CN | 201143874 Y | 11/2007 |
|---|---|---|
| JP | 10-218591 | 8/1998 |
| JP | 2001-248690 | 9/2001 |

OTHER PUBLICATIONS

Tractor Weight—Tractor Weight Bracket; obtained Feb. 21, 2010 from website at http://www.jimsrepairjimstractors.com/tractor-weight.htm.
Jim's Repair / Jim's Tractors, Tractor Weight—Tractor Weight Bracket, http://www.jimsrepairjimstractors.com/tractor-weight.htm, Jul. 13, 2010, 6 pages, Hastings, Minnesota.

* cited by examiner

Primary Examiner — Toan To

(57) ABSTRACT

An apparatus for adding weight to a work vehicle includes a receptacle and at least one arm projecting from the receptacle. The receptacle and the at least one arm are configured to receive weights. The apparatus for adding weight to a work vehicle also includes at least one connecting point configured to attach the apparatus to a three-point hitch of the work vehicle.

19 Claims, 3 Drawing Sheets

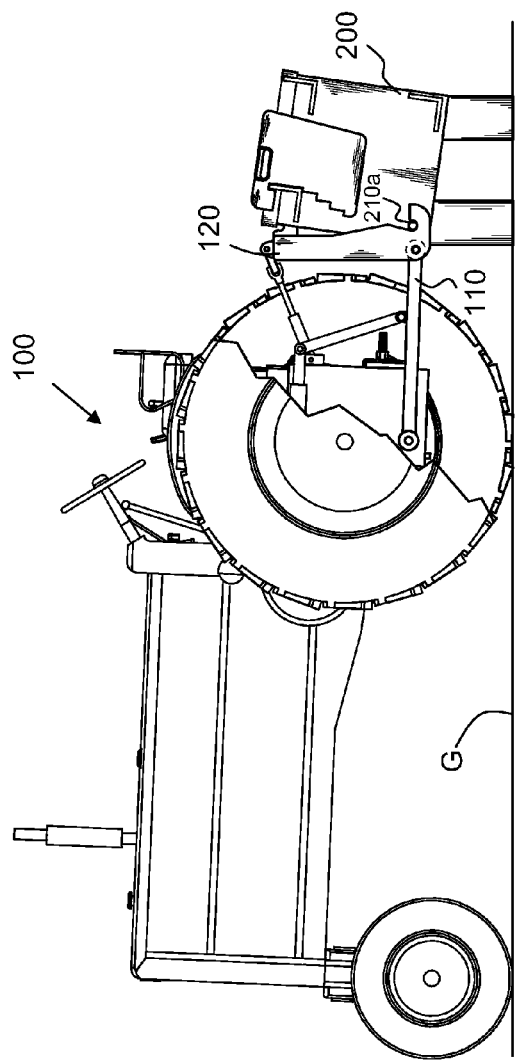
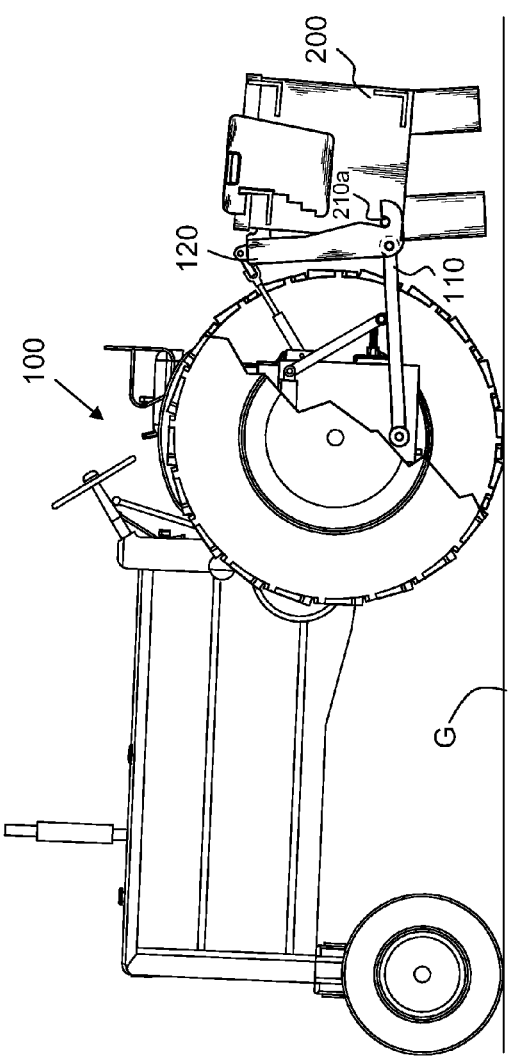
Figure 1A
Figure 1B

APPARATUS FOR ADDING WEIGHT TO A WORK VEHICLE

FIELD OF INVENTION

The present disclosure relates to an apparatus for adding weight to a work vehicle.

BACKGROUND

Adding weight to work vehicles such as tractors, combines, trucks, and so on may be desirable in certain applications. Examples of these applications include improving traction of the work vehicle and testing of tires for work vehicles.

Known methods of adding weight to a work vehicle include filling the work vehicle's tires with a liquid and attaching weights to the chassis or other parts of the work vehicle. However, filling the work vehicle's tires with a liquid may accelerate corrosion of the work vehicle's rims. Also, the amount of weight that may be added to the work vehicle by attaching weights to the chassis or other part of the work vehicle may be limited.

SUMMARY

An apparatus for adding weight to a work vehicle includes a receptacle and at least one arm projecting from the receptacle. The receptacle and the at least one arm are configured to receive weights. The apparatus for adding weight to a work vehicle also includes at least one connecting point configured to attach the apparatus to a three-point hitch of the work vehicle.

BRIEF DESCRIPTION OF THE DRAWINGS

In the accompanying drawings, structures are illustrated that, together with the detailed description provided below, describe exemplary embodiments of the claimed invention. One of ordinary skill in the art will appreciate that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

FIG. 1A illustrates a side view of a work vehicle with an apparatus for adding weight to the work vehicle attached.

FIG. 1B illustrates a side view of the work vehicle with the apparatus for adding weight to the work vehicle attached and raised.

DETAILED DESCRIPTION

Figure 2:
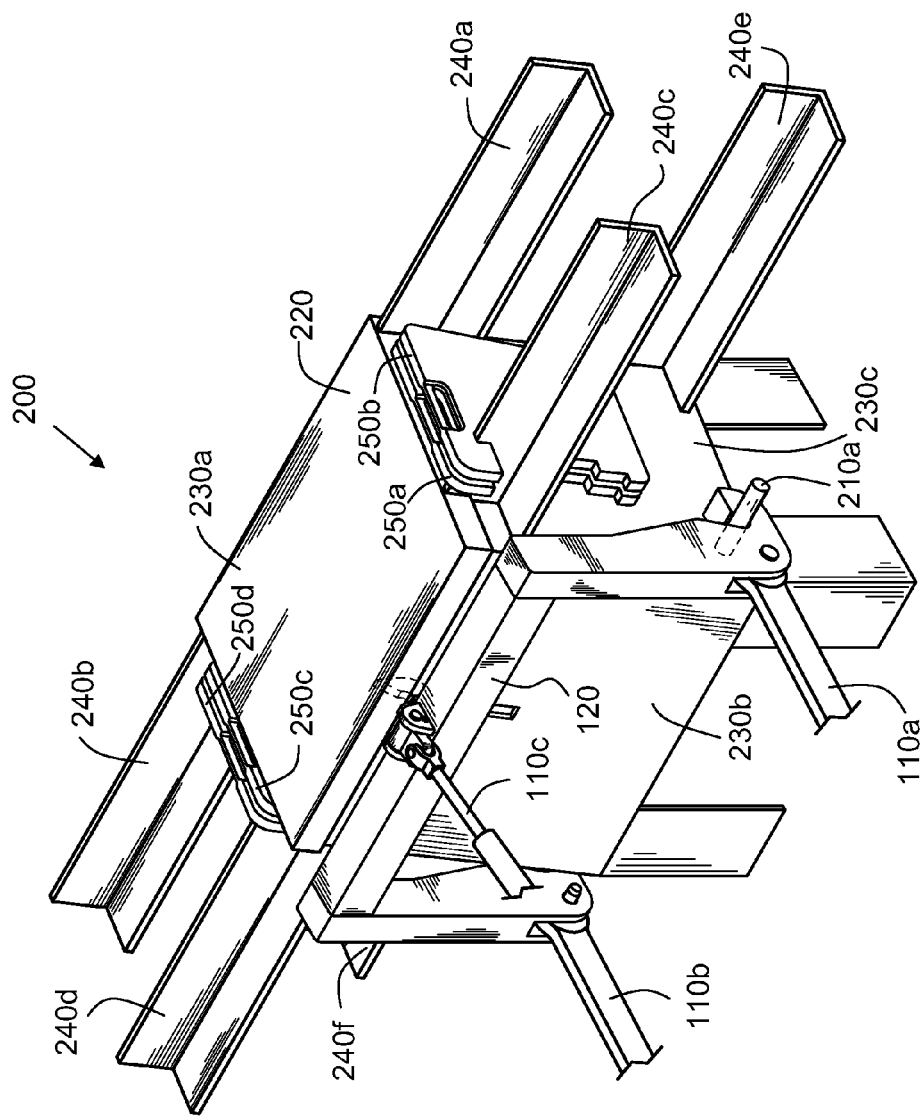
FIG. 2 illustrates a perspective view of the apparatus for adding weight to the work vehicle.

FIGS. 1A and 1B illustrate side views of a work vehicle 100 with an apparatus 200 for adding weight to the vehicle 100 attached. Although, the work vehicle 100 is shown in FIG. 1 as a tractor, the vehicle 100 may be one of various other work vehicles.

The apparatus 200 includes three connecting points 210 one of which, connecting point 210a, is illustrated. The connecting points 210 are configured to attach the apparatus 200 to a three-point hitch 110 of the work vehicle 100. The three-point hitch 110 includes an engagement member 120 configured to engage the connecting points 210.

The connection between the three-point hitch 110 and the connecting points 210 is a quick release connection such that the engagement member 120 engages and disengages the connecting points 210 without the use of additional hardware.

In the illustrated embodiment, the apparatus 200 includes three connecting points 210. In other embodiments, the apparatus includes more or less than three connecting points.

With reference to FIG. 1B, the connecting points 210 are configured such that the apparatus 200 remains engaged to the three-point hitch 110 while the three-point hitch 110 raises the apparatus 200 off the ground G. Thus, after the apparatus 200 has been engaged to the three-point hitch 110, the three-point hitch 110 may raise the apparatus 200 off the ground G and transfer the weight of the apparatus 200 to the vehicle 100.

FIG. 2 illustrates a perspective view of the apparatus 200. The apparatus 200 includes the connecting points 210 only one of which, connecting point 210a, is illustrated. The three-point hitch 110 of the vehicle 100 includes two lower arms 110a and 110b and one upper arm 110c. The three-point hitch 110 also includes the engagement member 120. The lower arms 110a and 110b can be operated to raise and lower the apparatus 200. The upper arm 110c can be operated to control the tilt of the apparatus 200.

The apparatus 200 includes a receptacle 220. The receptacle 220 has six sides three of which, sides 230a-c, are illustrated in FIG. 2. In this embodiment, the receptacle has the shape of a box or cuboid. In other embodiments, the receptacle may have other shapes with more or less than six sides (e.g. bowl, pyramid, and so on).

In the illustrated embodiment, the apparatus 200 includes six arms 240a-f projecting from the receptacle 220. The arms 240a-f project from the receptacle 220 substantially horizontally. In some embodiments (not shown), the apparatus may include less than six arms operably connected to the receptacle. In other embodiments (not shown), the apparatus may include more than six arms operably connected to the receptacle. In one embodiment (not shown), the apparatus includes four arms projecting from the receptacle. In some embodiments, the arms may project from the receptacle in configurations other than substantially horizontally.

In the illustrated embodiment, the arms 240a-f are configured to receive the weights 250a-d. The weights 250a-d are suitcase weights. As it is known in the art, suitcase weights are weights that include a handle for convenience of handling. In the illustrated embodiment, the arms 240a-f have an L-shaped cross section for receiving the suitcase weights 250a-d. In other embodiments (not shown), the arms may be configured to receive weights other than suitcase weights (barbells, disc weights, plates, and so on).

In one embodiment, the arms are configured to receive a plurality of weights totaling at least 1,800 pounds (816.5 kg). In another embodiment, the arms are configured to receive a plurality of weights totaling at least 30,000 pounds (13,608 kg). In other embodiments, the arms are configured to receive a plurality of weights totaling less than 30,000 pounds (13,608 kg). In yet another embodiment, the arms are configured to each receive at least ten suitcase weights. In alternative embodiments, the arms are configured to each receive less than ten suitcase weights.

Figure 3:
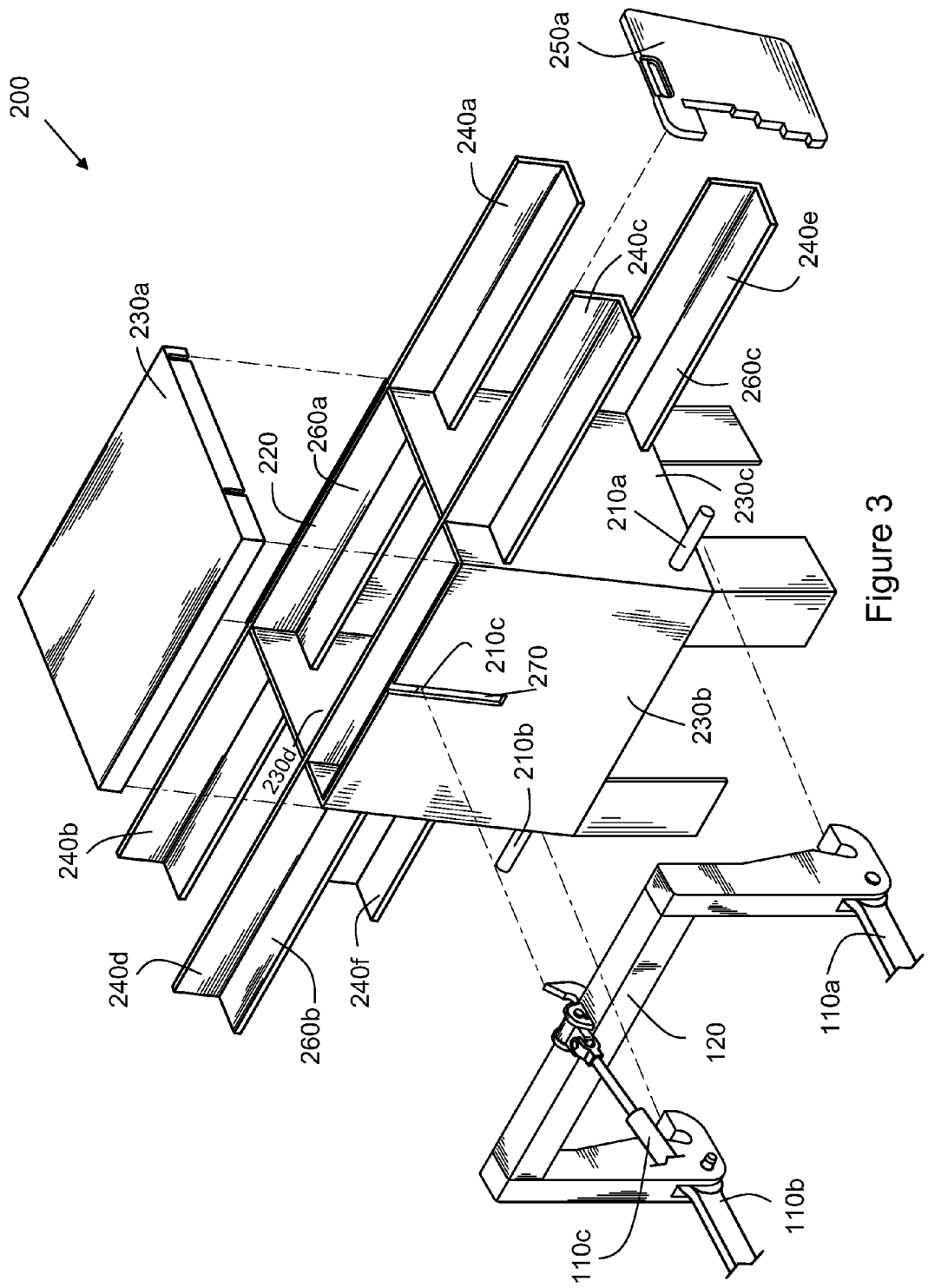
FIG. 3 illustrates an exploded view of the apparatus for adding weight to the work vehicle.

FIG. 3 illustrates an exploded view of the apparatus 200 for adding weight to a work vehicle. The receptacle 220 includes a removable side 230a. The removable side 230a may be removed from the receptacle 220 so that material (not shown)

for adding weight to the receptacle 220 may be received into the inside of the receptacle 220. In the illustrated embodiment, the removable side 230a is the top side or lid. In another embodiment, a removable side may be sides other than the top.

In one embodiment, the receptacle is configured to receive material totaling at least 4,000 pounds (1,814 kg) of added weight. In other embodiments, the receptacle may be configured to receive material totaling less than 4,000 pounds (1,814 kg) of added weight. Material to be added inside the receptacle may include lead, concrete, gravel, steel, water, and so on.

In other embodiments, the receptacle does not include a removable side. For example, the receptacle may have a permanent opening through which material may be added. In another example, one side may be hingedly connected to the rest of the receptacle and thus the one side may be opened to expose an opening through which material may be added.

In the illustrated embodiment, the arms 240a-f are portions of three members 260a-c. For example, the arms 240a and 240b are portions of the member 260a. A first portion of the member 260a, the arm 240a, protrudes through an opening on the side 230c of the receptacle 220. A second portion of the member 260a, the arm 240b, protrudes through openings on another side 230d of the receptacle 220.

In the illustrated embodiment, the members 260a-c are operably connected to the receptacle 220 by welding joints. In other embodiments (not shown), the arms or the members are operably connected to the receptacle by other means known in the art (e.g. fasteners, adhesives, interference fit, and so on). In one embodiment (not shown), the arms or the members are part of a unitary structure with the receptacle (e.g. a molded structure and so on).

In continued reference to FIG. 3, the members 260a-c are shaped to receive weights such as the weight 250a. In the embodiment, the member 260b, and thus the arm 240c, has a substantially L-shape along its longitudinal axis such that the member 260b, and thus the arm 240c, may receive suitcase weights such as the suitcase weight 250a. In other embodiments (not shown), the arms or members may be configured to receive weights other than suitcase weights (barbells, disc weights, plates, and so on).

The connecting points 210 include three connecting points 210a-c. In the embodiment, the three connecting points 210a-c are configured to be engaged by the engagement member 120. The connecting points 210a and 210b are operably connected to sides of the receptacle 220. For example, the connecting point 210a is operably connected to the side 230c. The connecting point 210c is disposed within the receptacle 220 for the engagement member 120 to engage the connecting point 120c through an opening 270 in the receptacle 220. In other embodiments, the connecting points may take forms other than those illustrated (e.g. an opening, a bar, a hook, a bracket, a loop, and so on.)

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which components are "operably connected," is one by which the operably connected components or the operable connection perform its intended purpose. For example, two components may be operably connected to each other directly or through one or more intermediate components.

While the present disclosure illustrates various embodiments, and while these embodiments have been described in some detail, it is not the intention of the applicant to restrict or in any way limit the scope of the appended claims to such detail. Additional advantages and modifications other than those mentioned will readily appear to those skilled in the art. Therefore, the invention, in its broader aspects, is not limited to the specific details, the representative embodiments, the advantages, and illustrative examples shown or described. Accordingly, departures may be made from such details without departing from the spirit or scope of the applicant's general inventive concept.

What is claimed is:

1. An apparatus for adding weight to a work vehicle, the apparatus comprising:
    a box-shaped receptacle having a bottom surface, a plurality of sides, and an opening configured to receive material;
    at least one arm projecting from the receptacle, wherein the at least one arm has an L-shaped cross-section, and where the at least one arm is configured to receive at least one weight; and
    at least one connecting point configured to attach the apparatus to a three-point hitch of the work vehicle.

2. The apparatus of claim 1, wherein the at least one arm is operably connected to the box-shaped receptacle.

3. The apparatus of claim 1, wherein the at least one connecting point is operably connected to the box-shaped receptacle.

4. The apparatus of claim 1, wherein the at least one arm includes a first arm that is a first portion of a member, wherein the at least one arm includes a second arm that is a second portion of the member, and wherein the first portion extends from a first side of the box-shaped receptacle and the second portion extends from a second side of the box-shaped receptacle.

5. The apparatus of claim 1, having at least four arms, wherein each of the arms is a portion of one of two members, and wherein each of the at least four arms protrudes from the box-shaped receptacle.

6. The apparatus of claim 1, wherein the at least one arm includes at least six arms, wherein each of the at least six arms is a portion of one of three members, and wherein each of the at least six arms protrudes from the box-shaped receptacle.

7. The apparatus of claim 1, wherein the plurality of sides of the box-shaped receptacle includes six sides.

8. The apparatus of claim 1, wherein the at least one arm is configured to receive at least one suitcase weight.

9. The apparatus of claim 1, wherein the at least one connecting point is configured for the apparatus to remain attached to the three-point hitch when the apparatus is in a lifted position corresponding to the apparatus lifted by the three-point hitch.

10. The apparatus of claim 1, wherein at least one of the plurality of sides of the box-shaped receptacle is removable.

11. An apparatus for adding weight to a work vehicle, the apparatus comprising:

a receptacle portion having a bottom surface and at least one side forming an enclosure, such that the receptacle is configured to receive material for adding weight to the work vehicle;

a plurality of arms projecting from the receptacle portion, and wherein the plurality of arms is configured to receive weights for adding weight to the work vehicle; and at least one connecting point operably connected to the receptacle and configured to attach the apparatus to a three-point hitch of the work vehicle.

12. The apparatus of claim 11, wherein the receptacle is configured to receive at least one of lead, concrete, gravel, steel, and water.

13. The apparatus of claim 11, wherein each arm from the plurality of arms has a substantially L-shape along their longitudinal axis such that the plurality of arms is configured to receive the weights in the form of suitcase weights.

14. The apparatus of claim 11, wherein at least one arm from the plurality of arms is a first portion of a member that protrudes from a first side of the receptacle portion.

15. The apparatus of claim 11, wherein each arm from the plurality of arms protrudes from the receptacle portion.

16. The apparatus of claim 11, wherein the at least one connecting point is configured for the apparatus to remain attached to the three-point hitch when the apparatus is in a lifted position corresponding to the apparatus lifted by the three-point hitch.

17. An apparatus for adding weight to a work vehicle, the apparatus comprising:

a receptacle;

at least three members extending through the receptacle and having portions projecting from the receptacle, and wherein the at least three members have a shape along their longitudinal axis configured to receive weights; and means for attaching the apparatus to a three-point hitch of the work vehicle.

18. The apparatus of claim 17, wherein the means for attaching are configured to keep the apparatus attached to the three-point hitch when the three-point hitch lifts the apparatus and substantially all the weight of the apparatus is supported by the three-point hitch.

19. The apparatus of claim 17, wherein each member from the at least three members has a substantially L-shaped cross-section.

\* \* \* \* \*